G. H. DU SELL.
CHUCK.
APPLICATION FILED JAN. 10, 1921.
1,391,177.　　　　　　　　　　　　Patented Sept. 20, 1921.
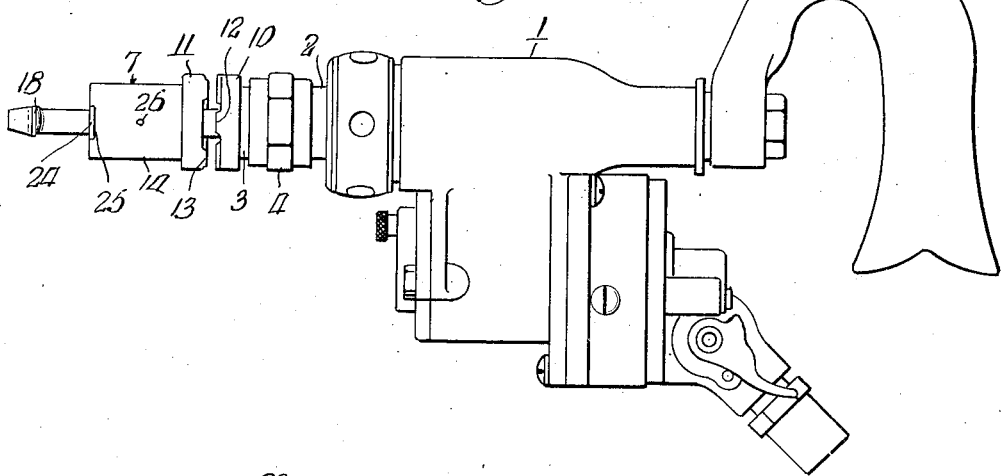
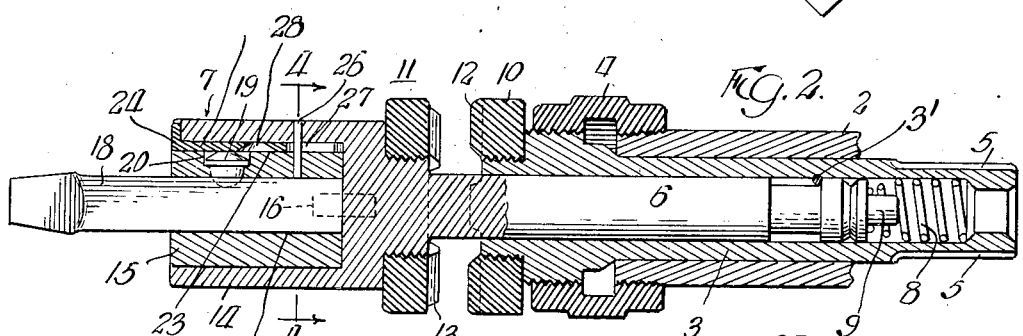
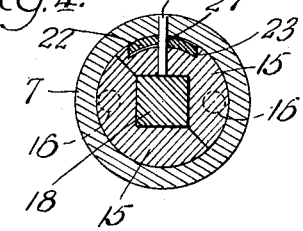
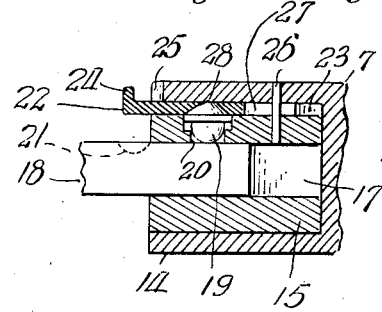
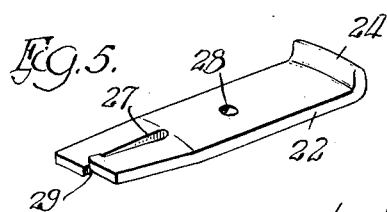
Inventor
Giles H. Du Sell
by Eugene Cenham
Atty.

UNITED STATES PATENT OFFICE.

GILES H. DU SELL, OF CHICAGO, ILLINOIS, ASSIGNOR TO INDEPENDENT PNEUMATIC TOOL COMPANY, OF CHICAGO, ILLINOIS, A CORPORATION OF DELAWARE.

CHUCK.

1,391,177.  Specification of Letters Patent.  Patented Sept. 20, 1921.

Original application filed February 9, 1920, Serial No. 357,187. Divided and this application filed January 10, 1921. Serial No. 436,053.

*To all whom it may concern:*

Be it known that I, GILES H. DU SELL, a citizen of the United States, residing at Chicago, in the county of Cook and State of Illinois, have invented new and useful Improvements in Chucks, of which the following is a specification.

This invention relates to tool holding chucks for rotary spindles of portable power driven tools, so that screw driver bits or socket wrenches may be fitted to said spindles to set screws and clamp nuts by power, and consists in the matters hereinafter described and more particularly set forth in the appended claims.

In the accompanying drawings—

Figure 1 is a side view of a tool of the kind mentioned and having connected with the rotary spindle thereof a chuck constructed in accordance with my invention;

Fig. 2 is an enlarged longitudinal sectional view taken through said chuck and the rotary spindle of the tool;

Fig. 3 is a like sectional view through the chuck and showing the locking member thereof in position allowing for removal or insertion of a tool shank;

Fig. 4 is a transverse sectional view taken on line 4—4 of Fig. 2; and

Fig. 5 is a perspective view of said locking member.

In Fig. 1 of the drawings, I have shown a portable power driven tool 1 of the type operated by a pneumatic motor contained in the outer casing of the tool. The tool has a rotary spindle 2 projecting outward from one end thereof. The spindle 2 is hollow and into the same is inserted a sleeve 3, which extends beyond the outer end of said spindle and is connected therewith by a nut 4. The inner end of the sleeve 3 is provided with one or more key slots 5 fitting keys (not shown) in the spindle 2 so that the latter and the sleeve will rotate in unison when the spindle is driven by the motor of the tool.

Extending into the sleeve 3 is the shank 6 of the tool holding chuck 7 forming the subject-matter of my present invention. The shank 6 is slidably and rotatably mounted in the sleeve and is held from dropping out of the same by a cross-pin 3' fixed in the sleeve and extending across an annular groove at the inner end of the shank 6, as shown in Fig. 2. A coiled spring 8 is in the sleeve at the rear of the shank 6 and bears against a thrust plug 9 at the inner end of said shank.

Secured to the outer end of the sleeve 3 is a clutch member 10, and secured to the chuck 7 is a coöperating clutch member 11. These clutch members have clutch teeth 12 and 13, respectively, which when engaged lock the sleeve and chuck together so that the two may be rotated in unison with the spindle 2 of the tool. The spring 8 normally holds the clutch members disengaged or apart, as shown in Figs. 1 and 2, so that the spindle will not rotate the chuck as long as the clutch members are disengaged. When the tool carried by the chuck 7 is forced against the work, the clutch members are moved into engagement and connect the chuck to the spindle. When the tool in the chuck is removed from the work, the spring acts to disengage or move the clutch members apart to disconnect the chuck from the spindle. The teeth of the clutch members have their engaging side faces inclined at such angles that one clutch member may slip with respect to the other when the chuck is held stationary while the clutch members are engaged.

The construction of the clutch members and the arrangement thereof in connection with the chuck and spindle constitute the subject-matter of my copending application Serial No. 357,187, filed February 9, 1920, and of which this present application is a division.

The chuck 7 has an enlarged head 14 provided with an outwardly opening cylindric recess to receive a like shaped block or member formed of two similar parts 15, 15. These parts are placed one on top of the other and pressed friction tight into the head 14 and are further held from rotation by one or more keys or dowel pins 16, both fixed to the head 14 and extending, one into each of said parts 15. Each part 15 is provided with one-half of a tool receiving socket 17 and into which, when the parts are together, is inserted the shank 18 of a screw driver bit or other implement to be held in the chuck. This shank 18 is square in cross-section and the socket 17 is similar in shape so that the shank is held from rotation in the chuck.

To releasably hold the shank 18 in the chuck, I provide a plug 19 slidably held in a counter-bored hole 20 in one of the blocks 15. The inner end of the plug 19 is rounded to fit in a concave recess 21 in the shank 18 when the parts register, as shown in Fig. 2. To hold the plug 19 from outward movement when in said recess, I provide a locking member preferably in the form of a relatively flat key plate 22 slidable endwise in a slideway 23 in said block part 15. This slideway 23 is curved transversely to conform to the shape of the block part 15, and the plate 22 has a like curvature and when in the slideway fits between the part 15 and the inner surface of the head 14, as clearly shown in Fig. 4. The plate 22 has a limited sliding movement in both directions, the inward movement being limited by a rib or projection 24 at the outer end of the plate contacting with the outer edge of the head 14 in a recess 25 formed in such edge to receive that part. The outward movement is limited by a pin 26 fixed in the head 14 and extending inward through an elongated slot 27 in the plate 22 adjacent its inner end, as shown in Figs. 2 and 3. The plate 22 is provided between its ends in its under surface with a conical socket or recess 28, and the outer end of the plug 19 is given a like shape to fit into the same when the parts register, as shown in Fig. 3. When the plate 22 is pulled outward as far as permitted by the pin 26, the recess 28 will register with the plug 19, and then an outward pull on the shank 18 to remove it from the chuck will raise or move the plug 19 outward into the socket 28 and release the shank so that it may be removed from the chuck and permit another tool to be inserted in the chuck. To lock the shank 18 in the chuck, the shank is inserted into the socket 17 until the recess 21 in the shank registers with the plug 19, whereupon the latter will drop or can be moved into said recess 21 by sliding the plate 22 inward, the coacting inclined surfaces acting to accomplish this, and the plug 19 is held from movement out of locking engagement with said shank by the plate 22. To prevent the plate from sliding accidentally, the inner end thereof is split or severed, as at 29, and the severed portions bent slightly upward and downward, respectively, so as to frictionally engage the parts between which the plate is inserted.

By reason of the construction described and shown, the shank of a screw driver bit or socket wrench may be fitted to the spindle of a portable power driven tool to set screws or clamp nuts by power and without stopping the rotation of the tool spindle each time that the implement carried by the chuck engages a screw or nut, or after the latter are set.

While I have shown and described in detail a tool holding chuck embodying the features of my invention, it is to be of course understood that the details of construction and arrangement of parts may be variously changed and modified without departing from the spirit and scope of my invention.

I claim as my invention:

1. A chuck, comprising a head having a socket, a block with a recess to receive the shank of a tool fitted in said socket and held against rotation, said block having a hole therein arranged transverse to said recess and opening into the same, a plug slidably mounted in said hole and adapted to engage the tool shank for holding the same in said block, and a locking plate slidably mounted on said block between the same and said head and movable with respect to said plug into and out of position holding said plug in locking engagement with the tool shank.

2. A chuck, comprising a head having a socket, a block with a recess to receive the shank of a tool fitted in said socket and held against rotation, said block having a hole extending therethrough transverse to said recess and opening into the same, a plug slidably mounted in said hole and adapted to enter a recess in the tool shank for holding the same in said block, and a locking plate slidably mounted on said block between the same and said head and movable over the outer end of said plug into and out of position holding said plug in locking engagement with the tool shank, said plate having a socket to receive said plug, when in register therewith, to permit the plug to release said shank.

3. A chuck, comprising a head having a socket, a block with a recess to receive the shank of a tool fitted in said socket and held against rotation, said block having a hole extending therethrough transverse to said recess and opening into the same, a plug slidably mounted in said hole and adapted to enter a recess in said shank for locking the same in said block, a locking plate slidably mounted on said block between the same and said head and movable over the outer end of said plug into and out of position holding said plug in locking engagement with the tool shank, said plate having a socket to receive said plug, when in register therewith, to release said shank, and means for limiting the sliding movement of said plate, consisting of a rib at the outer end of said plate and a fixed pin extending through an elongated slot in said plate.

4. A chuck, comprising a head having a socket, a block with a recess to receive the shank of a tool fitted in said socket and held against rotation, said block having a hole extending therethrough transverse to said recess and opening into the same, a plug slidably mounted in said hole and having a rounded inner end to enter a concave recess in said shank for locking the same in said block, and a locking plate slidably mounted on said block and movable over the outer end of said plug into and out of position holding said plug in locking engagement with the tool shank, said plate having a concave socket to receive the conical outer end of said plug, when in register therewith, to release said shank.

5. A chuck, comprising a head having a socket, a block with a recess to receive the shank of a tool fitted in said socket and held against rotation, said block having a hole therein transverse to said recess and opening into the same, a plug slidably mounted in said hole and adapted to enter a recess in said shank for locking the same in said head, and a locking plate slidably mounted on said block between the same and said head and movable over the outer end of said plug into and out of position holding said plug in locking engagement with the tool shank, said plate having a socket to receive said plug, when in register therewith, to release said shank, said plate having its inner end severed and spread apart to frictionally engage the block and head, respectively.

In testimony that I claim the foregoing as my invention, I affix my signature, this 4th day of January, A. D. 1921.

GILES H. DU SELL.